United States Patent [19]

Nikami

[11] 4,283,737

[45] Aug. 11, 1981

[54] VIDEO SIGNAL REPRODUCING APPARATUS WITH CIRCUIT AVOIDING SKEW DISTORTION WHEN OPERATED AT ABNORMAL SPEED AND/OR DIRECTION

[75] Inventor: Akira Nikami, Yokohama, Japan
[73] Assignee: Sony Corporation, Tokyo, Japan
[21] Appl. No.: 78,774
[22] Filed: Sep. 25, 1979
[30] Foreign Application Priority Data Sep. 26, 1978 [JP] Japan ............................... 53-118245

[51] Int. Cl.³ .......................................... H04N 5/795
[52] U.S. Cl. ............................................ 358/8; 360/9; 360/10; 360/11
[58] Field of Search .......................... 358/4, 8, 17, 18; 360/9, 10, 11, 76, 35, 38

[56] References Cited

U.S. PATENT DOCUMENTS

| | | | |
|---|---|---|---|
| 3,798,357 | 3/1974 | Narahara | 358/4 |
| 4,007,482 | 2/1977 | Amari | 358/4 |
| 4,007,484 | 2/1977 | Amari | 358/8 |
| 4,058,840 | 11/1977 | Kasprzak | 360/10 |
| 4,178,606 | 12/1979 | Hirota | 358/4 |

Primary Examiner—John H. Wolff
Assistant Examiner—Donald McElheny, Jr.
Attorney, Agent, or Firm—Lewis H. Eslinger; Alvin Sinderbrand

[57] ABSTRACT

In an apparatus for reproducing video signals recorded in successive, obliquely extending parallel tracks on a record tape with the horizontal synchronizing pulses of video signals recorded in nearby tracks being offset from each other by a predetermined distance in the direction along the tracks, and wherein at least one reproducing head is repeatedly moved across the tape in a scanning path which conforms to the direction along the tracks for reproducing from only one of the tracks at a time when the tape is driven or transported at a standard or normal reproducing speed, but which is at an angle to the direction along the tracks to cause the head to reproduce from one of the tracks and then from another of the nearby tracks when the tape is driven at a different reproducing speed; a delay circuit is provided for delaying the reproduced video signals by an amount corresponding to the offset distance between the horizontal synchronizing pulses recorded in nearby tracks, and, when operating with such different reproducing speed, a switching circuit alternately provides, as the output of the reproducing apparatus, the video signals as reproduced by the head and the delayed reproduced video signals, respectively, with the state of the switching circuit being changed-over each time the reproducing head, in moving along the scanning path, moves from one to the other of the nearby tracks.

15 Claims, 13 Drawing Figures

VIDEO SIGNAL REPRODUCING APPARATUS WITH CIRCUIT AVOIDING SKEW DISTORTION WHEN OPERATED AT ABNORMAL SPEED AND/OR DIRECTION

BACKGROUND OF THE INVENTION

1. Field of the Invention

This invention relates generally to a video signal reproducing apparatus, and more particularly is directed to improvements in such apparatus for avoiding skew distortion when reproducing is effected with the magnetic tape or other record medium being advanced at a speed and/or in a direction other than that used for recording.

2. Description of the Prior Art

It is well known to record video signals on a magnetic tape or other record medium by scanning successive parallel tracks on the record medium with one or more transducers energized by the video signals. In effecting such recording of video signals, it has been the usual practice to provide guard bands or unrecorded gaps between the successive parallel tracks so that, when a transducer scans one of the tracks for reproducing the signals recorded therein, such transducer will not also reproduce cross-talk, that is, signals recorded in the adjacent tracks. However, the provision of guard bands between the successive parallel tracks reduces the recording density, that is, the amount of signal information recorded on a unit area of the record medium, and thus does not permit the efficient utilization of the record medium for the recording of video signals.

In order to minimize cross-talk while permitting an increase in the recording density, it has been conventional to use two transducers or heads having air gaps with different azimuth angles for recording and reproducing signals in the next adjacent or alternate tracks, respectively. This is relatively easy to do because apparatus for magnetically recording and/or reproducing video signals frequently includes a rotary guide drum provided with two alternately operative transducers or heads which are diametrically opposed and which can have air gaps with different azimuth angles. The magnetic tape is wrapped helically about a portion of the perimeter of the guide drum and is moved longitudinally while the transducers or heads are rotated, thus causing the heads alternately to scan respective tracks on the tape for recording or reproducing signals therein. In the recording operation of the foregoing helical scan type VTR (video tape recorder), each head effects magnetization of magnetic domains in the magnetic coating on the tape in what would appear to be, if such domains were visible, a series of parallel lines or stripes each having a length as great as the width of the track, and each having an orientation that corresponds to the azimuth angle of the gap of the respective transducer or head. In the reproducing or playback operation of the apparatus, each track is scanned by the transducer or head having its gap aligned with the parallel, but fictitious, lines of that track, from which it follows that the gap of the transducer or head scanning a track for reproducing the video signals recorded therein extends at an angle to the mentioned fictitious lines of the tracks next adjacent to the track being scanned. By reason of the foregoing, if a transducer or head, in scanning a track for reproducing the video signals recorded therein, overlaps a next adjacent track or otherwise reproduces signals recorded in the latter, the well-known azimuth loss will result in attenuation of the cross-talk signal reproduced from the next adjacent track.

When recording color video signals which include luminance and chrominance components, it is known to separate such components and then to frequency modulate a relatively high frequency carrier with the luminance component, while the chrominance component is frequency converted so as to have its frequency band shifted below the frequency band of the frequency-modulated luminance component, whereupon the frequency-modulated luminance component and the frequency converted chrominance component are combined to provide the composite video signals which are recorded in the successive parallel tracks. Since the previously mentioned azimuth loss is generally proportional to the frequency of the signals, the azimuth loss is relatively effective to decrease or eliminate interference due to cross-talk in respect to the relatively high frequency frequency-modulated luminance component. However, interference due to cross-talk from the relatively low frequency or frequency-converted chrominance component is not sufficiently reduced by the use of transducers having different azimuth angles. Thus, when recording color video signals, it has been proposed, for example, as disclosed in detail in U.S. Pat. No. 4,007,482, issued Feb. 8, 1977, and having a common assignee herewith, to reduce or eliminate interference due to cross-talk in respect to a relatively low frequency signal recorded in next adjacent tracks by recording the frequency converted chrominance component or other low frequency signal in such adjacent tracks with different first and second carriers, respectively, which may be distinguished from each other by their respective polarity characteristics. In a particular disclosed embodiment of the foregoing scheme, the first carrier for the frequency-converted chrominance component has its phase unchanged throughout the recording of the video signals in a respective track, while the second carrier for the chrominance component recorded in the next adjacent track has its phase inverted or changed by 180° for successive line intervals in the case of recording NTSC color video signals, or after every two line intervals in the case of recording PAL color video signals. When a head scans a particular track for reproducing the video signals recorded therein, the chrominance component of cross-talk signals from the tracks next adjacent to the scanned track can be conveniently suppressed or eliminated, for example, with the aide of a simple comb filter, by reason of the different polarity or phase characteristics of the carriers with which the chrominance component was recorded in the scanned track and in the tracks next adjacent thereto, respectively.

If, during reproducing operation of the helical scan type VTR, the speed and direction of movement of the tape are equal to the standard tape speed and direction, respectively, for recording, then the scanning path of each rotary head or transducer can be made to accurately coincide with a respective one of the record tracks for properly reproducing the video signals recorded therein, and the above described measures are effective for substantially eliminating cross-talk in respect to signals recorded in the tracks next adjacent the track being scanned.

However, in practical embodiments of the helical scan type VTR, the standard tape speed for recording is conveniently selected in relation to the diametrical size of the guide drum so that the positions at which the horizontal synchronizing pulses of the video signals are recorded in the nearest to each other tracks recorded by the same head are displaced from each other, in the direction along the tracks, by $\frac{1}{2}$ of a horizontal period (H), that is, $\frac{1}{2}$ of the distance that the rotary head or transducer moves during a horizontal or line period of the video signals. Thus, in the case where odd and even numbered fields of the video signals are respectively recorded by first and second diametrically opposed heads in alternating tracks on the magnetic tape, the positions at which the horizontal synchronizing pulses are recorded in a track containing an odd numbered field, for example, will be spaced or shifted by distances corresponding to $\frac{1}{2}$ the horizontal period (H) in respect to the positions at which horizontal synchronizing pulses are recorded in the next adjacent or nearest tracks containing odd fields. By reason of the foregoing, when a reproducing operation is performed with the tape being driven in the direction opposite to that for recording, or with the tape being driven in the same direction as for recording, but at a substantially greater speed, a so-called skew distortion may appear in the reproduced picture.

More particularly, if the tape speed during reproducing is substantially different from that for recording, or if the direction of tape movement during reproducing is different from that during recording, the scanning path of each head may be at a sufficiently large angle to the direction along the recorded tracks so that, in traversing such scanning path, each head will move along, and reproduce video signals from first one and then another of the nearby tracks which have the positions of the recorded horizontal synchronizing pulses offset by $\frac{1}{2}$ the horizontal period (H). If such signals reproduced from first one track and then another during a single field interval are demodulated and fed to a television receiver, a disturbance of jump of $\frac{1}{2}$H occurs in the continuity of the horizontal synchronizing pulses at the change over of the reproducing head or transducer from one track to the other. During the scanning period in which the automatic frequency control (AFC) circuit of the television receiver absorbs the jump of $\frac{1}{2}$H, a skew distortion will appear in the reproduced picture.

OBJECTS AND SUMMARY OF THE INVENTION

Accordingly, it is an object of the present invention to provide a video signal reproducing apparatus which is free of the above mentioned problems burdening the prior art.

More particularly, it is an object of this invention to provide a video signal reproducing apparatus with a relatively simple circuit arrangement for avoiding skew distortion of a reproduced picture when the reproducing operation is carried out with the tape speed and/or direction being different from that employed for recording.

In accordance with an aspect of this invention, in an apparatus for reproducing video signals recorded in successive parallel tracks extending at an angle to the length of a record tape with horizontal synchronizing pulses of the video signals recorded in nearby tracks being offset from each other in the direction along the tracks: at least one reproducing head is repeatedly moved across the tape in a scanning path which conforms to the direction along the record tracks for reproducing from only one of the tracks during each traversal of the scanning path by the head so long as the tape is transported at a standard reproducing speed and direction, and which is at an angle to the direction along the tracks when the tape is transported at a reproducing speed or direction other than such standard speed and direction, respectively, so as to cause the head to successively move along, and reproduce video signals from first one and then another of the nearby tracks during each traversal of the scanning path; delay means is provided for delaying the reproduced video signals by an amount corresponding to the offset of the horizontal synchronizing pulses recorded in the nearby tracks from which the head successively reproduces video signals; switching means alternately provides, as an output therefrom, the video signals as reproduced by the head and the delayed video signals from the delay means; and control means is operative to change over the switching means upon movement of the head from one to another of the nearby tracks from which signals are reproduced in traversing the scanning path, whereby discontinuity of the reproduced horizontal synchronizing pulses in the output of the switching means is avoided along with the resulting skew distortion of the reproduced picture.

The above, and other objects, features and advantages of the invention, will be apparent in the following detailed description of illustrative embodiments of the invention which is to be read in connection with the accompanying drawings.

DESCRIPTION OF THE PREFERRED EMBODIMENTS

Figure 1:
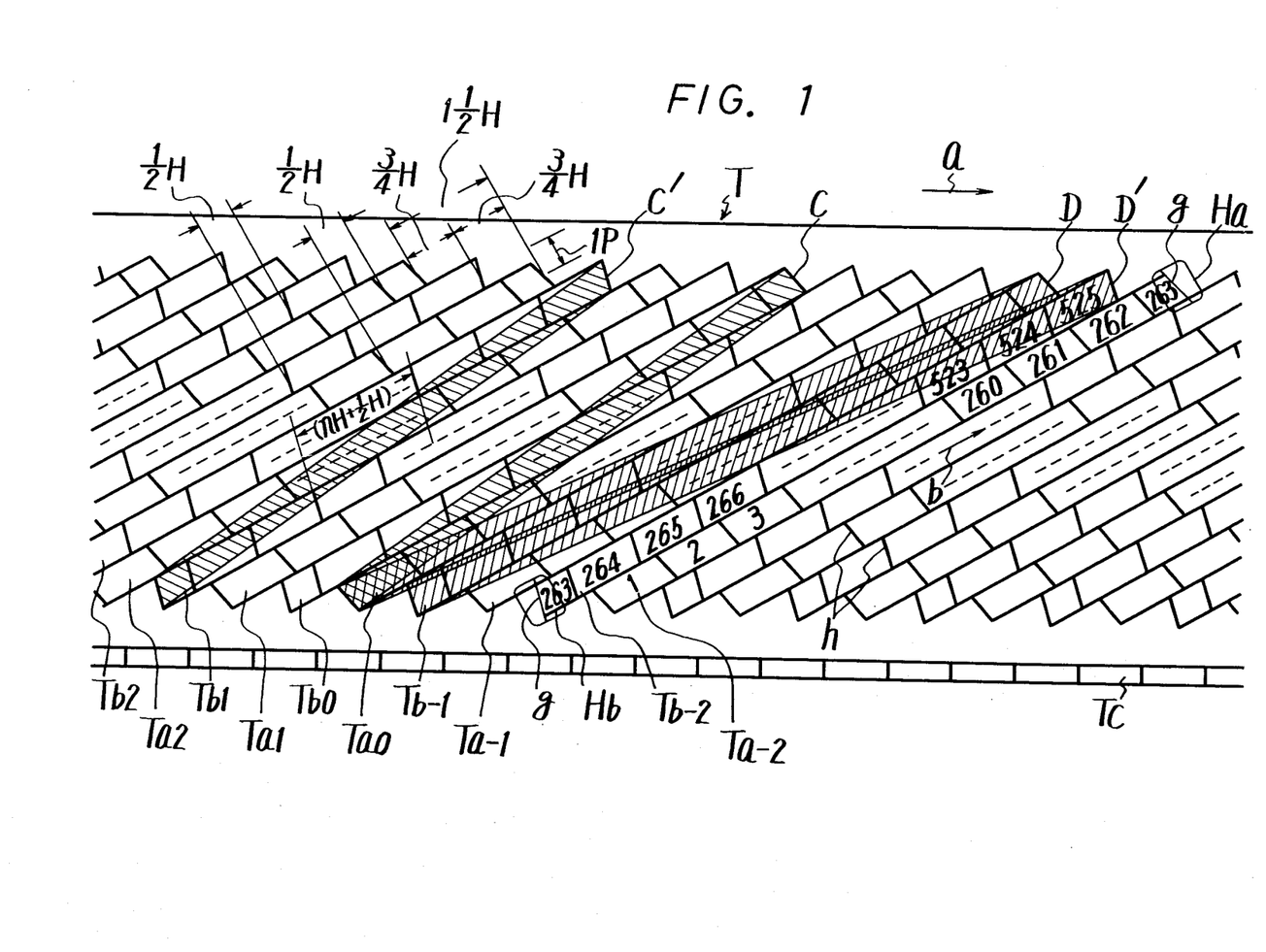
FIG. 1 is an enlarged diagrammatic view of a length of magnetic tape on which a number of record tracks are illustrated, and to which reference will be made in specifically explaining problems to be overcomed by the present invention.

Referring to the drawings in detail, and initially to FIG. 1 thereof, it will be seen that, when a tape T is continuously advanced or driven at a standard speed in the direction of the arrow a and a pair of diametrically opposed rotary heads $H_a$ and $H_b$ are rotated to cause the heads to alternately scan obliquely across the tape in the direction of the arrow b on FIG. 1, then such heads $H_a$ and $H_b$ can alternately record video signals in parallel record tracks $T_a$ and $T_b$, respectively, which are skewed or arranged at a predetermined angle in respect to the longitudinal direction of tape T. In the example shown on FIG. 1, heads $H_a$ and $H_b$ have gaps g with different azimuth angles, and the standard tape speed for recording is selected so that the adjacent record tracks $T_a$ and $T_b$ will abut along their longitudinal margins, that is, guard bands between the tracks are eliminated, for achieving a high density of recording of the video signals on magnetic tape T. In the case of the recording of NTSC video signals comprised of 30 frames per second, the diametrically opposed heads $H_a$ and $H_b$ are conventionally rotated at the speed of 30 revolutions per second so that each of the heads will record a field of video signal information while scanning across tape T. In other words, odd-numbered fields of the video signals may be recorded in the tracks $T_a$ recorded by head $H_a$ having its gap at an azimuth angle slanting toward the left with respect to the direction across the respective track, and even-numbered fields of the video signals are recorded in the tracks $T_b$ recorded by head $H_b$ having its gap at an azimuth angle slanting toward the right.

Further, as is conventional in the recording of NTSC video signals, the field recorded in each of the tracks $T_a$ and $T_b$ includes 262 ½ lines or horizontal periods of video information. In other words, the odd-numbered field recorded in each track $T_a$ includes the video signal information for lines or horizontal periods (1)–(262) and the first half of line (263), while the even-numbered field recorded in each track $T_b$ commences with the last half of line (263) and further contains lines (264)–(525). In order that the first and second halves of the 263rd horizontal period or line will be recorded in the odd- and even-numbered fields, respectively, the two adjacent tracks $T_a$ and $T_b$ are, at their ends, displaced longitudinal by a distance equivalent to ¾H, that is, ¾ of the distance along a track in which a horizontal line or period of the video signals is recorded. It will be apparent that, in the case where the positions at which recording commences in the next adjacent tracks $T_a$ and $T_b$ are shifted relative to each other by the distance ¾H in the direction along the tracks, the positions at which recording commences in nearby tracks recorded by means of the same head, for example, the tracks $T_{a1}$ and $T_{a2}$ recorded by head $H_a$, or the tracks $T_{b1}$ and $T_{b2}$ recorded by the head $H_b$, will be spaced from each other by the distance 1½H in the direction along the record tracks. By reason of the foregoing, and as shown on FIG. 1, the positions h at which the horizontal synchronizing pulses or signals of the video signals are recorded in each of the tracks $T_a$ are offset or shifted by ½H in the direction along the tracks from the positions h at which the horizontal synchronizing pulses or signals are recorded in the next nearest tracks $T_a$, that is, either the next earlier or the next later track recorded with the same head. Similarly, the positions h at which the horizontal synchronizing pulses are recorded in each of the tracks $T_b$ are offset by ½H in respect to the positions at which the horizontal synchronizing pulses are recorded in either the next earlier or next later track recorded by the same head $H_b$. In other words, the positions at which the corresponding horizontal synchronizing pulses or signals are recorded in the nearby tracks $T_a$, or in the nearby tracks $T_b$, are offset, in the direction along the tracks, by the distance nH+½H (in which n is a positive integer). As further shown on FIG. 1, control signals are desirably recorded in a track $T_c$ extending along one longitudinal edge of tape T, with such control signals being at locations which are in predetermined relationships to the record tracks $T_a$ and $T_b$.

In the reproducing operation of a video signal reproducing apparatus of the helical scan type with the tape T of FIG. 1 being driven at the standard speed, and in the same direction as was employed for recording, the paths along which the heads $H_a$ and $H_b$ alternately scan across tape T will be parallel to record tracks $T_a$ and $T_b$ so that a suitable conventional servo system can control the rotary movements of the heads and/or the instantaneous speed at which the tape is driven for ensuring that each of the heads $H_a$ and $H_b$ will accurately scan a track $T_a$ or $T_b$, respectively, for reproducing the video signals recorded therein without substantial distortion.

However, if the recorded video signals are reproduced with the tape T being driven at a speed and/or in a direction different from that employed for recording, the path along which each of the heads $H_a$ and $H_b$ scans tape T no longer coincides with a record track and, more particularly, there is an angular deviation of the scanning path from the direction along the record tracks $T_a$ and $T_b$. For example, if the tape is driven in the forward direction, that is, in the same direction as for recording, but at a speed three times the normal recording speed, then the head $H_a$, in its scanning trace represented by the shaded area C on FIG. 1, will move along the tracks $T_{a0}$, $T_{b0}$ and $T_{a1}$, in succession. Similarly, the other head $H_b$, in its scanning trace represented by the shaded area C' on FIG. 1, will move along the tracks $T_{b1}$, $T_{a2}$ and $T_{b2}$, in succession. If it is assumed that color video signals were recorded in the tracks $T_a$ and $T_b$ on FIG. 1 by means of the previously described arrangements of U.S. Pat. No. 4,007,482, for eliminating cross-talk in respect to signals reproduced from next adjacent tracks, then it will be appreciated that head $H_a$, in its scanning trace C, will reproduce the video signal recorded in track $T_{a0}$ during the initial portion of scanning trace C and thereafter reproduce the video signal recorded in the track $T_{a1}$ during the concluding portion of scanning trace C, whereas the video signal recorded in the intervening track $T_{b0}$ which is next adjacent the tracks $T_{a0}$ and $T_{a1}$ will be substantially eliminated or suppressed. Similarly, head $H_b$ will reproduce the video signal recorded in the track $T_{b1}$ during the initial portion of scanning trace C', and the video signal recorded in the track $T_{b2}$ will be reproduced during the concluding portion of scanning trace C', while the video signal recorded in the intervening track $T_{a2}$ will be substantially eliminated or suppressed.

As also shown on FIG. 1, if the tape is transported or driven at the standard speed used for recording, but in the opposite direction, then the scanning trace of head $H_a$ represented by shaded area D bridges the tracks $T_{a0}$, $T_{b-1}$ and $T_{a-1}$, in succession, and, similarly, the scanning trace of head $H_b$ represented by shaded area D' bridges the tracks $T_{b-1}$, $T_{a-1}$ and $T_{b-2}$, in succession. Accordingly, in the course of scanning trace D, head $H_a$ reproduces the video signal recorded in track $T_{a0}$ at the initial portion of the scanning trace and the video signal recorded in track $T_{a-1}$ is reproduced during the concluding portion of the scanning trace, while the signal recorded in the intervening track $T_{b-1}$ is substantially suppressed or eliminated. Similarly, head $H_b$ reproduces the video signal recorded in track $T_{b-1}$ in the initial portion of the scanning trace D' and the video signal recorded in the track $T_{b-2}$ in the concluding portion of scanning trace D', whereas the video signal recorded in the intervening track $T_{a-1}$ is substantially suppressed or eliminated.

If the above described signals reproduced by head $H_a$ or head $H_b$ from two tracks in succession as the heas traverses its scanning path are demodulated and then applied to a television receiver, a disturbance or jump of ½H occurs in the continuity of the horizontal synchronizing pulses or signals as the head changes over from one track to the other. By reason of the foregoing, a skew distortion appears in the reproduced picture during the period that the automatic frequency control (AFC) circuit of the television receiver is absorbing the ½H jump.

Figure 2:
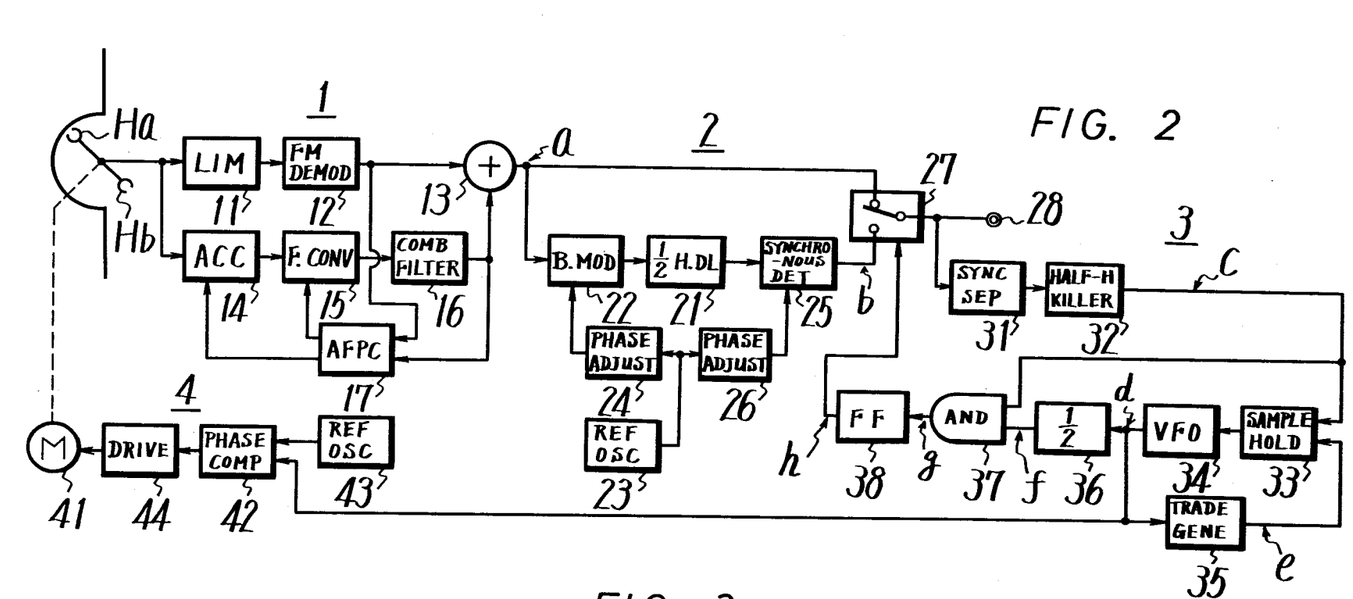
FIG. 2 is a block diagram showing a video signal reproducing apparatus according to an embodiment of the present invention.

Refering now to FIG. 2, it will be seen that a video signal reproducing apparatus capable of avoiding the foregoing problem in accordance with the present invention generally comprises a circuit 1 for restoring a reproduced composite signal to its original form, for example, that of the standard NTSC color video signal, a circuit 2 for selectively delaying the reproduced video signals, a circuit 3 for detecting skew distortion and controlling circuit 2 so as to eliminate the same, and a servo circuit 4.

More particularly, in the embodiment of FIG. 2, the circuit 1 is shown to include a limiter 11 through which a frequency modulated luminance component of the composite color video signal alternately reproduced by heads $H_a$ and $H_b$ is supplied to an FM demodulator 12 in which the luminance component is demodulated and then fed to one input of a mixer circuit 13. A frequency converted chrominance component of the composite signal reproduced by heads $H_a$ and $H_b$ is supplied through an automatic chrominance control (ACC) circuit 14 to a frequency converter 15 which restores or reconverts the chrominance carrier signal to the original relatively high frequency. As disclosed in detail in U.S. Pat. No. 4,007,482, in the case where the frequency converted chrominance component is recorded in the next adjacent tracks $T_a$ and $T_b$ with different first and second carriers, respectively, which, for example, are distinguished from each other by their respective polarity characteristics, the frequency converting signal supplied to frequency converter 15 for acting therein on the reproduced chrominance component from ACC circuit 14 is suitably controlled so that the chrominance component obtained at the output of frequency converter 15 will have a carrier of uniform frequency and phase, for example, corresponding to that of the standard NTSC color video signal, and further so that cross-talk components in the output of frequency converter 15 will be blocked or eliminated in a comb filter 16 through which the output of frequency converter 15 is applied to another input of mixer circuit 13. Mixer circuit 13 combines the demodulated luminance component from frequency demodulator 12 and the reconverted chrominance component from frequency converter 15 to provide a recombined color video signal. It will be appreciated that cross-talk in respect to the luminance component has been eliminated by the different azimuth angles of the heads $H_a$ and $H_b$ for recording and reproducing signals in next adjacent tracks, respectively, while cross-talk in respect to the chrominance component has been eliminated from the recombined signal by comb filter 16. The output of frequency demodulator 12 and the output of comb filter 16 are further connected to a signal forming circuit 17 for supplying to the latter the horizontal and vertical synchronizing signals from the demodulated luminance component and the color burst signals from the reconverted chrominance component. The signal forming circuit 17 desirably includes known automatic frequency and phase control (AFPC) circuits which respond to the synchronizing and burst signals to provide a control signal for ACC circuit 14 and a suitable frequency converting signal for frequency converter 15.

Figure 3:
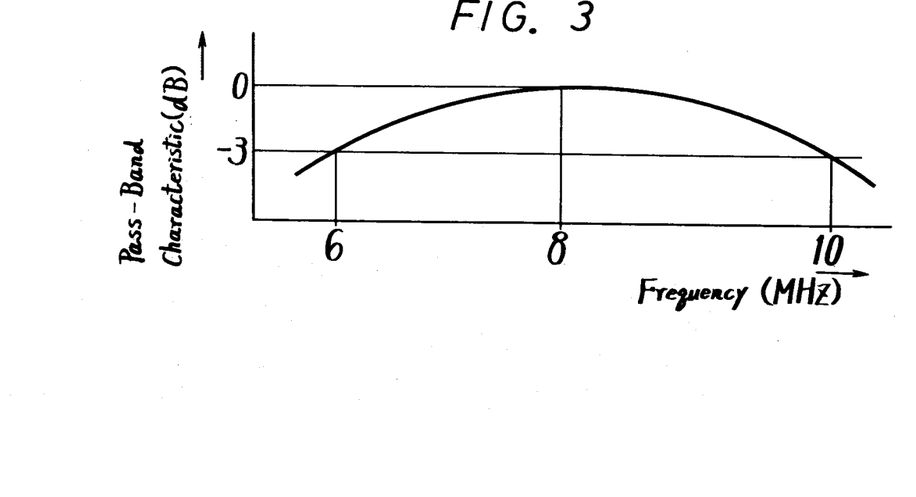
FIG. 3 is a graph showing the frequency characteristic of a glass delay line of a type that may be employed in the apparatus of FIG. 2.

In accordance with the present invention, circuit 2 is shown to include a delay line or element 21 which, for use of the apparatus in reproducing signals recorded in the manner shown on FIG. 1, provides a delay of ½H. The delay element 21 is desirably constituted by a glass delay line which has a frequency characteristic so as to pass therethrough a signal of a wide frequency band, such as, a color video signal. It will be seen that a glass delay line with the frequency characteristic shown on FIG. 3 has a frequency pass band of 6 to 10 MHz centered at 8 MHz, and with an attenuation or drops of 3 dB at the limits of the band. It will be appreciated that the amount of delay provided by the delay element 21 may be any amount greater than ½H which satisfies (n+½H) with n being a positive integer. Accordingly, the color video signal can be passed by the SSB (single side band) of the residual side band. In such case, in order to remove a beat obstacle to the signal, the carrier frequency at the time of the delay is selected to be high and the LSB (low side band) is employed. In order to achieve the foregoing, the recombined color video signal from mixer circuit 13 is supplied to a balanced modulator 22 which also receives an alternating signal having a frequency of 10.74 MHz obtained from a reference oscillator 23 through a phase adjuster 24. The signal from balanced modulator 22 is supplied to delay element 21, and the output of the latter is supplied to a synchronous detector or demodulator 25 which is also supplied with the alternating signal from reference oscillator 23 through a phase adjuster 26. The synchronously detected output of circuit 25, that is, the delayed signal, and the output of mixer circuit 13 are applied to respective inputs of a switching circuit 27 so as to be selectively delivered to an output terminal 28.

Figure 4A:
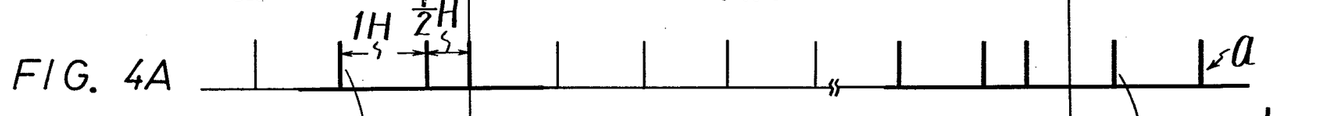
FIGS. 4A–4H show waveforms to which reference will be made in explaining the operation of the apparatus of FIG. 2.
Figure 4B:
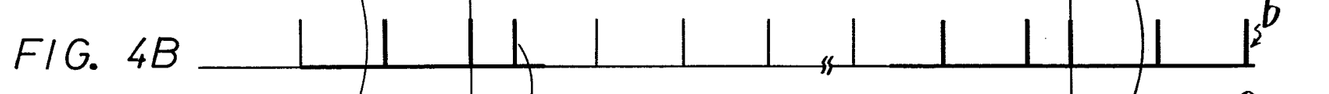
Figure 4C:
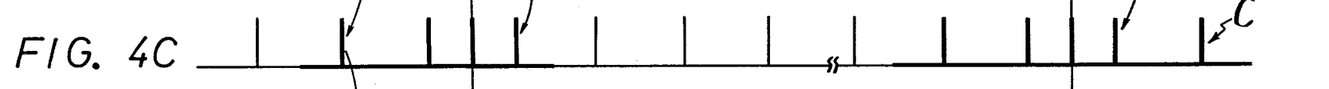
Figure 4D:
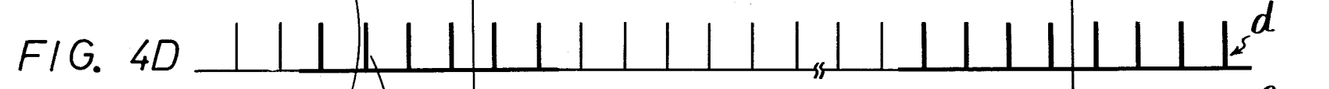
Figure 4E:
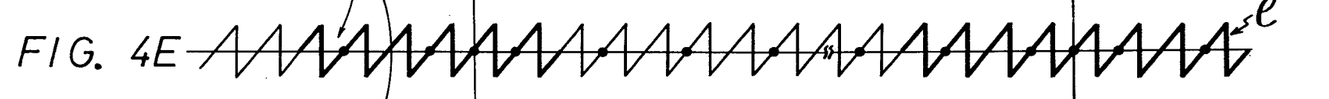
Figure 4F:
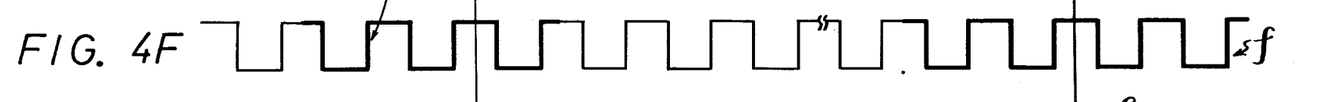
Figure 4G:
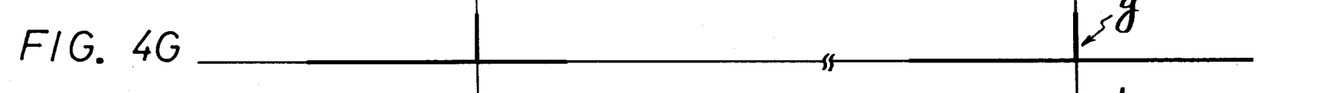

In order to control switching circuit 27, circuit 3 is shown to include a synchronous separator circuit 31 through which synchronizing signals in the output signal from switching circuit 27 are applied to a ½-H killer circuit 32 which removes the equalizing pulse in the vertical fly-back period and delivers the horizontal synchronizing pulses or signals c shown on FIG. 4C. Such horizontal synchronizing signals c are supplied to a sample-hold circuit 33 which samples a signal e from a trapezoidal signal generator 35. The signal e from generator 35, which is shown in FIG. 4E to be in the form of a sawtooth wave, is sampled in circuit 33 at the location of such dot on FIG. 4E in response to the reception by circuit 33 of each horizontal synchronizing pulse or signal c (FIG. 4C) from ½-H killer circuit 32. The resulting output from sample-hold circuit 33 is applied, as a control voltage, to a variable frequency oscillator 34 having an output d (FIG. 4D) with a center frequency twice that of the horizontal frequency, and serving as a reference oscillation. Such reference oscillation d is shown to be supplied from variable frequency oscillator 34 to generator 35 for controlling the latter and thereby forming a socalled AFC (automatic frequency control). The reference oscillation d from oscillator 34 is further supplied to a frequency divider 36 which provides a signal f (FIG. 4F) with a frequency ½ that of the oscillation d, and which is supplied to one of the input terminals of an AND circuit 37 while another input terminal of circuit 37 receives the signal c from ½-H killer circuit 32. The arrangement is such that AND circuit 37 produces a signal g (FIG. 4G) which is at a low level, for example, the logic level "0", when the horizontal synchronizing signal c from circuit 32 is of a predetermined phase, but which rises to a relatively high level "1" when a horizontal synchronizing signal from circuit 32 appears at the position of ½H, for example, at the times $t_a$ and $t_b$. Such signal g from AND circuit 37 is supplied to a T-flip-flop circuit 38 which provides a signal h (FIG. 4H) to switching circuit 27 for controlling the change over operation of the latter.

The signal d from variable frequency oscillator 34 is further employed in servo circuit 4 for controlling a motor 41 by which rotary heads $H_a$ and $H_b$ are driven. More particularly, signal d from oscillator 34, which is synchronized with the horizontal synchronizing signals in the reproduced video signals and has a frequency twice that of the horizontal frequency, is supplied to one input of a phase comparator 42. At another input, comparator 42 is supplied with a reference signal from a reference oscillator 43 which has a fixed frequency twice that of the horizontal frequency. Any phase difference between the two inputs to comparator 42 causes the latter to provide a deviation signal to a drive circuit 44 by which the operating speed of motor 41 is controlled.

The operation of the apparatus according to this invention, as shown on FIG. 2, will now be described assuming that the tape T is being driven in the same direction as for recording, but at three times the normal recording speed. In that case, for example, head $H_a$ scans track $T_{a0}$ until the time $t_a$, heads $H_a$ and $H_b$ successively scan tracks $T_{a1}$ and $T_{b1}$ between the times $t_a$ and $t_b$, and head $H_b$ scans track $T_{b2}$ after time $t_b$. It will be apparent that heads $H_a$ and $H_b$ do not move instantly from one track to the adjacent track, but rather move gradually from one track to the other. Further, since the effective gap length of each of the heads $H_a$ and $H_b$ is longer than the track width, there will be periods when horizontal synchronizing signals or pulses are reproduced by one head from two tracks simultaneously. However, for the sake of clarity in illustration, only the horizontal synchronizing signals of larger amplitude are shown on FIGS. 4A to 4C.

During the interval up to the time $t_a$ and during the interval after the time $t_b$, switching circuit 27 is in the condition or state represented on FIG. 2 so that the video signals of the output of mixer circuit 13 are directly supplied to output terminal 28 and includes the horizontal synchronizing signals or pulses shown on FIG. 4A. However, during the interval between time $t_a$ and time $t_b$, switching circuit 27 is changed over so that the delayed signals from detector circuit 25 (FIG. 4B) are supplied to output terminal 28. Thus, output terminal 28 receives reproduced video signals in which the horizontal synchronizing pulses or signals are as shown on FIG. 4C so as to avoid any discontinuity or jump in such horizontal synchronizing signals or pulses.

Since the signal e (FIG. 4E) produced by the trapezoidal signal generator 35 has a frequency twice the horizontal frequency, even if a horizontal synchronizing signal is present in the output of circuit 32 at the position corresponding to ½H, for example, as at the time $t_a$ on FIG. 4C, the value that is sample-held in circuit 33 is substantially constant. Therefore, even when the head $H_a$ or $H_b$ moves from one to another of the respective tracks $T_a$ or $T_b$, in succession, for example, when head $H_a$ moves from track $T_{a0}$ to track $T_{a1}$ so that, as shown on FIG. 4A, horizontal synchronizing signals appear in the output of head $H_a$ during the scanning of track $T_{a1}$ at positions deviated by ½H from the positions of the horizontal synchronizing signals in the output of that head $H_a$ during scanning of the track $T_{a0}$, the variable frequency oscillator 34, under control of the sample-held value from circuit 33, always achieves continuous oscillation, and hence delivers the signal d (FIG. 4D) to frequency divider 36 in synchronism with the horizontal synchronizing signals and at twice the horizontal frequency. The resulting square wave signal f (FIG. 4F) obtained from frequency divider 36 and the signal c (FIG. 4C) from circuit 32, when applied to AND circuit 37, cause the output g of AND circuit 37 to go high at the time $t_a$ when head $H_a$ moves from track $T_{a0}$ to track $T_{a1}$, and again at the time $t_b$ when head $H_b$ moves from track $T_{b1}$ to track $T_{b2}$. In other words, the signal g from AND circuit 37 goes high whenever the horizontal synchronizing pulses or signals in the output of switching circuit 27 shift by ½H from the preceding horizontal synchronizing signals.

Each time the output g of AND circuit 37 goes high, for example, as at the times $t_a$ and $t_b$ (FIG. 4G), such output signal g causes flip-flop 38 to change its state. Thus, the output h (FIG. 4H) of flip-flop 38 goes from a low level to a high level at the time $t_a$, and is restored to the low level again at the time $t_b$. In response to the rising output h of flip-flop 38 at the time $t_a$, switching circuit 27 is changed-over from the state shown on FIG. 2 and in which the output of mixer circuit 13 is delivered directly to output terminal 28, to the state in which the output of detector 25 is delivered to terminal 28. At the time $t_b$, the falling level of output h of flip-flop 38 causes switching circuit 27 to be restored to the position shown on FIG. 2, so that thereafter the output of mixer circuit 13 is again delivered directly to output terminal 28. Thus, it will be appreciated that the reproduced video signals obtained from output terminal 28 contain horizontal synchronizing signals as shown on FIG. 4C.

Figure 4H:
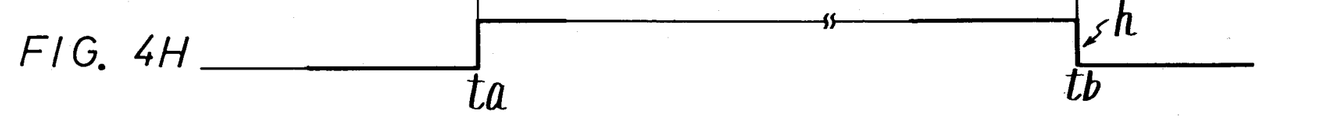

Although FIG. 4H shows the changes in the output h of flip-flop 38, and the consequent change-over of switching circuit 27, occurring precisely at each of the times $t_a$ and $t_b$ when a horizontal synchronizing signal or pulse appears in the output of the reproducing head at a time which is ½H from the preceding horizontal synchronizing signal or pulse, the actual change-over of switching circuit 27 from one state or condition to the other may be somewhat delayed from the time $t_a$ or $t_b$ without encountering any problems, so long as the change-over of switching circuit 27 is effected before the next or following horizontal synchronizing signal is reproduced.

It will be apparent from the foregoing that, in the apparatus according to the present invention, each time one or the other of the heads $H_a$ and $H_b$ moves successively from one to another of the respective tracks $T_a$ or $T_b$ in the course of a scanning trace, switching circuit 27 is changed over so that the recombined video signals directly from mixer circuit 13 and such signals delayed by ½H, as by delay line 21, are alternately delivered to output terminal 28. Therefore, the video signals delivered to output terminal 28 contain horizontal synchronizing pulses or signals with intervals H therebetween so as to avoid any skew distortion of the reproduced picture. Although it is possible that, at the times when switching circuit 27 is changed over, for example, at the times $t_a$ and $t_b$ on FIGS. 4A–4H, an excess horizontal synchronizing signal may be generated, as in FIG. 4C, or a single horizontal synchronizing signal may be omitted, such excessive generation or dropout of a horizontal synchronizing signal does not affect the otherwise uniform spacing in time of the horizontal synchronizing pulses or signals and will not cause skew distortion of the reproduced picture.

It will be noted that in the embodiment of this invention described with reference to FIG. 2, the balanced modulation in modulator 22 and the synchronous detection or demodulation in detector 25 are both effected by a carrier from the same oscillator 23 for simplifying the construction of the circuit and ensuring its stable operation. Since the signal is delayed in delay line 21, its phase is varied and, therefore, the phases of the carrier applied from oscillator 23 to modulator 22 and detector 25 are suitably shifted or corrected by phase adjusters 24 and 26.

In the apparatus shown on FIG. 2, the recombined video signals obtained at the output of mixer circuit 13 are AM-modulated in balanced modulator 22 so as to have a relatively high frequency band of 6 to 10 MHz. However, if desired, the recombined video signal from mixer circuit 13 may be FM-modulated prior to being delayed, in which case, the problems due to phase variation and so on are removed so that the circuit construction can be further simplified. It is also to be appreciated that an electric charge transfer element, such as, a charge coupled device (CCD) or the like, may be used in place of the described glass delay line 21. In that event, since a sufficiently wide pass band is obtained in a low frequency band, the frequency converting and reconverting means constituted by the modulator 22 and demodulator detector 25 on FIG. 2 can be omitted.

Even where it is desirable, by reason of the characteristics of the delay line 21, to upwardly convert the frequency of the output of mixer circuit 13 prior to delaying the same and then to downwardly convert or reconvert the frequency following the delaying action, it is apparent that suitable devices other than the illustrated balanced modulator 22 and synchronous detector 25 can be used for such upward and downward converting, respectively.

Figure 5:
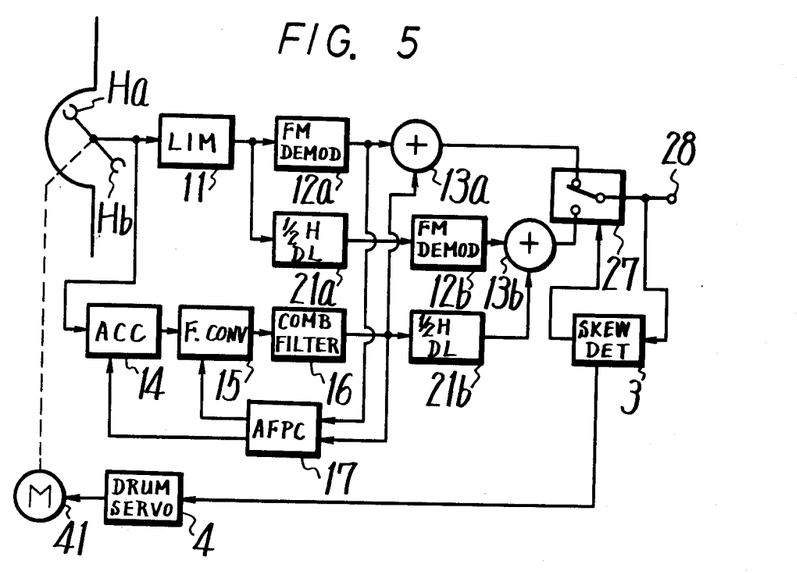
FIG. 5 is a block diagram showing a video signal reproducing apparatus according to another embodiment of the present invention.

Referring now to FIG. 5, in which components corresponding to those described above with reference to FIG. 2 are identified by the same reference numerals, it will be seen that, in another embodiment of this invention, the frequency modulated luminance component of the reproduced video signals is supplied through limiter 11 to an FM-demodulator 12a and also through a delay element or line 21a, having a delay of ½H, to an FM-demodulator 12b. The demodulated luminance component from demodulator 12a is applied to a first input of a mixer circuit 13a, while the demodulated delayed luminance component from demodulator 12b is applied to a first input of a mixer circuit 13b. The reproduced cross-talk free chrominance component from comb filter 16 is, in this case, supplied directly to a second input of mixer circuit 13a, and through a delay line 21b, having a delay of ½H, to a second input of mixer circuit 13b. The outputs of mixer circuits 13a and 13b are connected to the two inputs, respectively, of switching circuit 27 so as to be alternately applied to output terminal 28. It will be apparent that the output of mixer circuit 13a is comprised of color video signals resulting from recombination of the reproduced luminance and chrominance components, while the output of mixer circuit 13b is comprised of color video signals delayed by ½H, that is, resulting from the recombination of the delayed luminance and chrominance components.

As in the first described embodiment of the invention, in the apparatus of FIG. 5, the circuit 3 controls switching circuit 27 so that the reproduced video signals and the video signals delayed by ½H are alternately delivered to output terminal 28 so as to maintain a sequence of horizontal synchronizing signals with the period or interval H therebetween. Further, in the embodiment of FIG. 5, the luminance component is delayed by delay line 21a while still in the form of a frequency modulated signal, and the chrominance component is delayed by delay line 21b only after the reproduced chrominance component has been reconverted back to the standard high frequency band in converter 15. By reason of the foregoing, in the apparatus of FIG. 5, delaying of the reproduced luminance and chrominance components can be effected without the special modulation and demodulation thereof provided by the balanced modulator 22 and synchronous detector 25 in the apparatus of FIG. 2.

Figure 6:
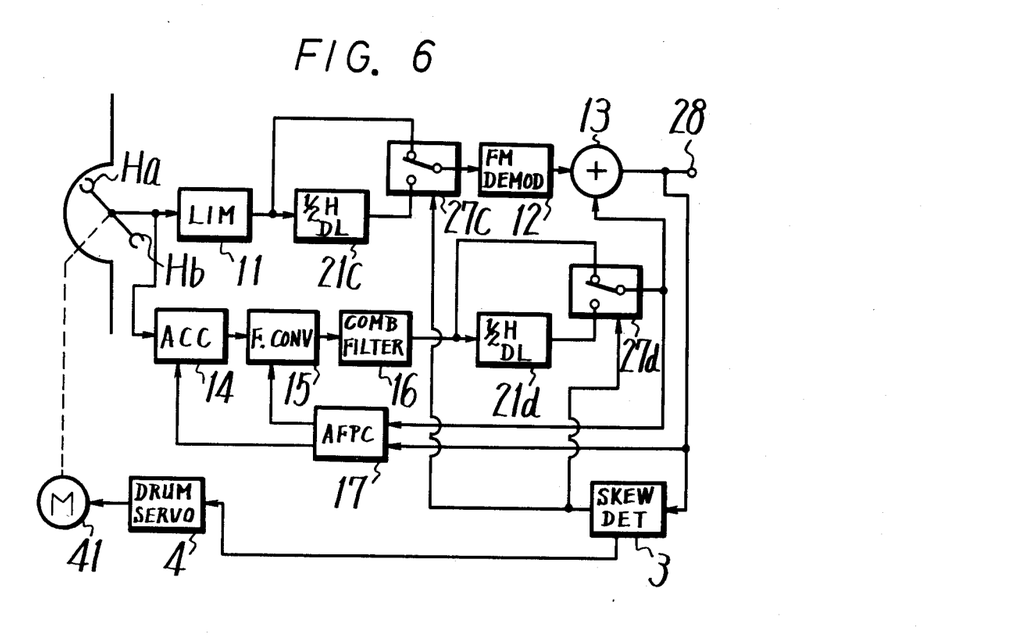
FIG. 6 is a block diagram showing a video signal reproducing apparatus according to still another embodiment of the invention.

Referring now to FIG. 6, in which components corresponding to those previously described with reference to FIG. 2 are again identified by the same reference numerals, it will be seen that, in the embodiment of the invention illustrated on FIG. 6, the reproduced frequency modulated luminance component is applied from limiter 11 directly to a first input of a switching circuit 27c and also through a delay line 21c having a delay of ½H to a second input of switching circuit 27c. The output of switching circuit 27c is connected to an FM demodulator 12 which is, in turn, connected to one input of mixer circuit 13. The reconverted chrominance component from comb filter 16 is applied directly to a first input of a second switching circuit 27d and, through a delay line 21d having a delay of ½H to a second input of switching circuit 27d which has its output connected to another input of mixer circuit 13. In this embodiment, both switching circuits 27c and 27d are simultaneously changed-over or controlled by skew distortion detecting and control circuit 3 which is substantially similar to that described with reference to FIG. 2. Further, in the embodiment of FIG. 6, the chrominance component delivered from switching circuit 27d and the output of mixer circuit 13 applied to output terminal 28 are both supplied to signal forming circuit 17 for use in the latter in producing the original controlling ACC circuit 14 and the frequency converting signal for circuit 15.

In FIG. 6, as in FIG. 5, the luminance component and the chrominance component of the reproduced video signals are delayed in lines 21c and 21d, respectively, while occupying relatively high frequency bands so that the modulator 22 and detector or demodulator 25 of FIG. 2 can be omitted, as shown. Further, although the signals supplied to signal forming circuit 17 are obtained from the outputs of switching circuits 27c and 27d, respectively, such signals are coincident with each other so that no problems can occur therefrom.

In the embodiments of the invention shown on FIGS. 2, 5 and 6, the delay lines 21 and 21a–21d have been described as providing delays of ½H so as to adapt the respective apparatus for use with a magnetic tape recorded with the format shown on FIG. 1, that is, with the positions of the horizontal synchronizing signals, as recorded in two tracks $T_a$ or $T_b$ which are spaced from each other by an intervening track $T_b$ or $T_a$, respectively, being displaced or unmatched by a distance corresponding to ½H. However, the invention is not limited to use with only that recording format. In other words, reproducing apparatus according to this invention may be provided for use with recording formats in which tracks that are spaced from each other by an intervening track have horizontal synchronizing signals recorded therein at positions that are spaced or deviate from each other in the direction along the tracks by other than ½H. In such cases, the delay lines or elements corresponding to the delay lines 21 and 21a–21d are provided with delay times corresponding to the actual deviations between the positions at which the horizontal synchronizing signals are recorded.

Further, the invention has been described as applied to apparatus for reproducing color video signals, but it is obvious that the invention can be similarly applied to an apparatus for reproducing monochrome or black and white video signals. Moreover, in the recording format shown on FIG. 1, the so-called guard bands are omitted between adjacent tracks $T_a$ and $T_b$, but it will be appreciated that the invention can also be applied to apparatus for reproducing video signals recorded in successive parallel tracks with guard bands therebetween.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for reproducing video signals recorded in successive parallel tracks extending at an angle to the length of a record tape with horizontal synchronizing pulses of the video signals recorded in nearby tracks being offset from each other in the direction along said tracks, comprising:
   at least one reproducing head;
   means for moving each said head repeatedly across the tape in a scanning path which is substantially parallel to said direction along the tracks so long as the tape is transported lengthwise at a standard reproducing speed in a predetermined direction, each said head reproducing from one of said tracks adjacent to said scanning path during each traversal of the latter by the head with the tape being transported at said standard speed in said predetermined direction, said scanning path being at an angle to said direction along the tracks when the tape is transported in opposition to said predetermined direction or at a reproducing speed other than said standard speed so as to cause said head to move along, and reproduce said video signals from first one and then another of said nearby tracks in succession during each traversal of said scanning path;
   delay means for delaying the reproduced video signals by an amount corresponding to said offset of the horizontal synchronizing pulses recorded in said nearby tracks;
   switching means having first and second states alternately providing, as an output therefrom, the video signals reproduced by said head and the delayed video from said delay means; and
   control means operative to change-over said switching means upon movement of said head from one to another of said tracks in the course of a traversal of said scanning path.

2. An apparatus according to claim 1; in which said control means includes means for separating said horizontal synchronizing pulses from said output of the switching means, and means responsive to a change in the intervals between the horizontal synchronizing pulses separated from said output of the switching means for changing-over the latter from one of said states to the other.

3. An apparatus according to claim 2; in which said means responsive to a change in said intervals between the separated horizontal synchronizing pulses includes means for generating a square-wave signal which is synchronized with said separated horizontal synchronizing pulses so as to have high level portions normally disposed between said separated horizontal synchronizing pulses, and means responsive to the coinciding of one of said high level portions of the square-wave signal with one of said separated horizontal synchronizing pulses for changing-over said switching means.

4. An apparatus according to claim 3; in which said means for changing-over the switching means includes AND circuit means providing an output in response to said coinciding of said one high level portion with said one separated horizontal synchronizing pulse, and flip-flop means having first and second states and being triggered by said output from the AND circuit means for changing-over said switching means.

5. An apparatus according to claim 1; in which said delay means has a frequency characteristic favoring the passage therethrough of signals in a relatively high frequency range; and further comprising frequency converting means before and after said delay means, respectively, for increasing the frequency of the reproduced video signals to said high frequency range prior to the delaying thereof, and for returning the delayed video signals to their original frequency range.

6. An apparatus according to claim 5; in which said frequency converting means includes balanced modulator means operatively positioned before said delay means, and synchronous detecting means operatively positioned after said delay means.

7. An apparatus according to claim 6; in which said frequency converting means further includes a single oscillator generating a carrier signal for said balanced modulator means and said synchronous detecting means, and first and second independently operable phase adjusters through which said carrier signal is applied to said balanced modulator means and said synchronous detecting means, respectively.

8. An apparatus according to claim 1; in which at least a component of said video signals is recorded as a frequency modulation of a relatively high frequency carrier, and said delay means has a frequency characteristic favoring the passage therethrough of signals in a relatively high frequency range; and further comprising frequency demodulating means acting on said component of the delayed video signals.

9. An apparatus according to claim 8; in which said frequency demodulating means is interposed between said delay means and said switching means.

10. An apparatus according to claim 8; in which said frequency demodulating means is operatively disposed to act on the output of said switching means.

11. An apparatus according to claim 1; in which the recorded video signals are a composite of a luminance component frequency modulating a relatively high frequency carrier and a chrominance component having its carrier frequency down-converted from a standard frequency; and further comprising frequency demodulating means for demodulating the frequency modulated luminance component of the reproduced video signals, frequency converting means for reconverting the carrier frequency of the chrominance component of the reproduced video signals back to said standard frequency, and mixer means for recombining the demodulated luminance component and the reconverted chrominance component.

12. An apparatus according to claim 11; in which said delay means includes a single delay line interposed between said mixer means and said switching means.

13. An apparatus according to claim 12; in which said single delay line has a frequency characteristic favoring its use with signals in a relatively high frequency range; and further comprising additional frequency converting means before and after said single delay line, respectively, for increasing the frequency of the output of said mixer means to said high frequency range prior to the delaying thereof, and for returning the delayed signals to their original frequency range.

14. An apparatus according to claim 11; in which said delay means includes a first delay element acting on the frequency modulated luminance component of the reproduced video signals, and a second delay element acting on the reconverted chrominance component of the reproduced video signals; said frequency demodulating means includes a first demodulator respectively acting on the frequency modulated luminance component as reproduced by said head, and a second demodulator acting on the output of said first delay element; and said mixer means includes a first mixer circuit recombining the demodulated luminance component from said first demodulator and said reconverted chrominance component, and a second mixer circuit recombining the delayed demodulated luminance component from said second demodulator and the delayed reconverted chrominance component from said second delay element.

15. An apparatus according to claim 11; in which said delay means include a first delay element acting on the frequency modulated luminance component of the reproduced video signals, and a second delay element acting on the reconverted chrominance component of the reproduced video signals; said switching means includes a first switching circuit which, in said first and second states, alternately provides, as an output, the frequency modulated luminance component of the reproduced video signals and the output of said first delay element, respectively, and a second switching circuit which, in said first and second states, alternately provides, as an output, the reconverted chrominance component of the reproduced video signals and the output of said second delay element, respectively; said demodulating means acts on said output of said first switching circuit; and said mixer means recombines the output of said demodulating means and said output of the second switching circuit.

* * * * *